March 8, 1949.  LIAN-TONG WEN  2,464,191
COMBINED INSTRUMENT PANEL WITH
TOLERANCE INDICATING MEANS
Filed Feb. 21, 1947
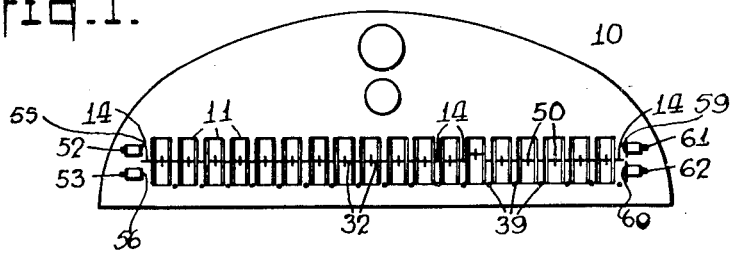
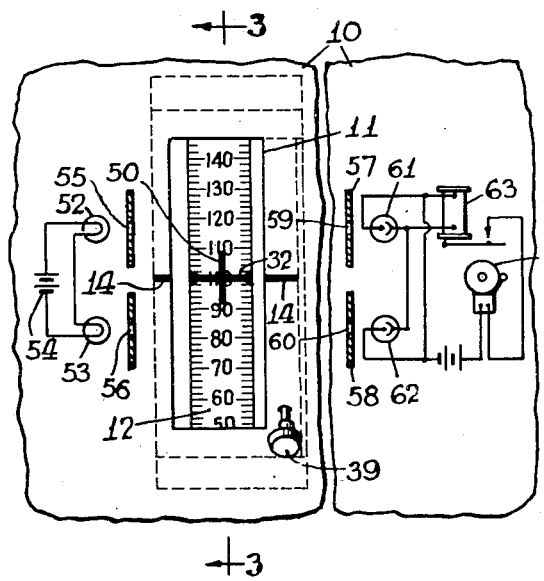
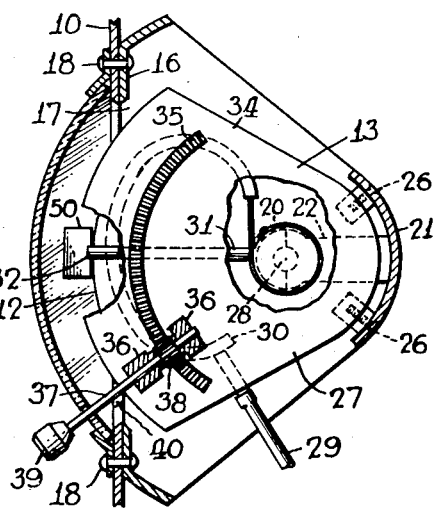
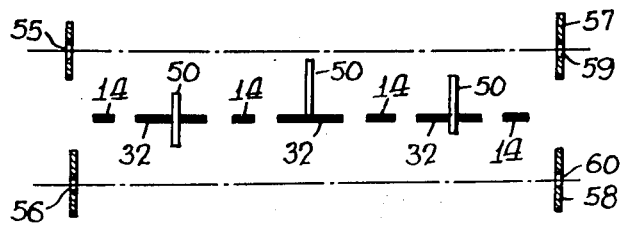
INVENTOR
Lian-Tong Wen
BY
ATTORNEY Patented Mar. 8, 1949

2,464,191

UNITED STATES PATENT OFFICE 2,464,191

COMBINED INSTRUMENT PANEL WITH TOLERANCE INDICATING MEANS

Lian-Tong Wen, New York, N. Y., assignor of one-third to Jacob T. Basseches, Scarsdale, N. Y.

Application February 21, 1947, Serial No. 730,163

3 Claims. (Cl. 177—311)

This invention relates to a combined control and instrument panel; and more particularly to means for determining the condition of operation of instruments on a panel.

This invention is a continuation-in-part of my invention described and set forth in an application for patent entitled Instrument panel and method for adjusting instruments thereon, filed August 14, 1946, Serial No. 690,417.

In my aforementioned application for patent, I describe a panel for a plurality of instruments whereby all indicators of said instruments may be substantially aligned with respect to each other, and more particularly with respect to indicium on said panel. My application also describes and discloses a method for checking, supervising and controlling an instrument board having a plurality of instruments by procedure for aligning the instrument casing so that the instruments, at their operating stage, with their indicators, will have a fixed position relative to each other whereby departure from the relative position may be quickly detected.

Still more particularly I have described an instrument panel whereby maintenance of predetermined settings may be secured and departure from such predetermined settings determined at a glance, or by other means, to determine whether one or more indicators during operation have departed from the normal.

In accordance with my present invention, I have devised more specific means for determining, without the human factor being involved, a departure of the indicators of the instruments from a normal or predetermined setting. Thus, as an amplification of my prior invention for determining whether one or more indicators during operation have departed from the normal, I employ a signalling means, such as a ray of light, and a light sensitive cell, as the means for establishing a rectilinear zone of normal operation, or a boundary of a zone of operation, and employ the indicators as a means of obstructing the projection of light through the zone, using an obscuration or variation of the projected light to give an audible or visual signal.

More specifically, in accordance with an application of my prior invention for determining whether one or more indicators have departed from the normal, I propose to provide the indicators, arranged in accordance with my invention, with a light modifying shield, and propose that any departure from the normal will serve to interrupt the projection of light between a light beam and a light responsive cell, such as a potassium or selenium cell. The rectilinear projection of the light beam or any other projecting source, when so obscured or modified, may therefore be readily observed and an audible or visual signal thereby given, to warn the observer of a departure of one or more instruments from a predetermined setting.

Thus it is contemplated by my invention more specifically to provide, in an instrument assembly, particularly those which have their casing elements mounted so that the indicators thereof may be predeterminedly aligned with reference to each other and to indicium on the panel, means to determine whether one or more of the indicators have departed from a predetermined setting, and to use such departure as the means for giving a signal, such as an audible or visual signal.

To attain these objects and such further objects as may appear herein or be hereinafter pointed out, I make reference to the accompanying drawing, forming a part hereof, in which—

Figure 1 is a fragmentary elevation of an instrument panel, illustrating one embodiment of my improvement;

Figure 2 is a magnified fragmentary portion thereof;

Figure 3 is a section taken on the line 3—3 of Figure 2;

Figure 4 is a fragmentary view showing means for mounting obscuring disks of varying sensitivity.

Making reference to the drawing, it is contemplated by my invention, in accordance with my prior application aforementioned, to provide an instrument panel 10 where a plurality of instruments are adjustably connected so that the edgewise dials 12 are substantially tangential to the panel and viewable through aligned apertures 11. To either side of the apertures I may provide indicium 14 to form a reference line, to give one continuous line of reference across the panel. One or more of the instrument casings 13 are supported on brackets 16 or other supporting means described in my prior application, so that by means of a flexible connection 29 in the form of flexible tubing, pigtail wiring or the like, a reading is transmitted to the variable element 30, which in turn operates the indicator needle 31 so that its extension 32 is readable edgewise on the edgewise dial 12.

As in my prior application, one or more or all of the instruments have their lateral casings 34 provided with means, such as an annular rack 35 and a turn knob 36, to adjust the entire casing with its indicator 30 in reference to the indicium 14. In the present application, the indicator 32 carries an obscuring disk 50, which is visible edgewise through the edgewise aperture 11, substantially in the plane of the panel along the indicium 14. The obscuring disk may be wholly opaque or partially opaque, depending upon the tolerances to be maintained, as will be more particularly hereinafter explained.

I provide light sources 52 and 53, operated by the source of power 54 behind the slits 55 and 56, for projecting controlled rays in parallelism with the indicium 14 across the panel. These rays are arranged to project against the targets 57 and 58, having apertures 59 and 60, respectively. Behind the apertures or slits 59 and 60 are light sensitive cells 61 and 62, such as selenium or potassium cells, controlled by well known balanced circuits, to operate the relay 63 for the signalling device 64. The circuits for the light sensitive cells 61 and 62 to the signalling device 64 need not here be described, except to state that so long as the rays of light project through the apertures 55 and 56, to the apertures 59 and 60, a predetermined condition of the signalling device 64 is maintained. Should the indicator 32 carry its disk to obscure the ray projected through slits 55 and 56, the signalling circuit will become unbalanced, to provide a signal for the signalling device 64. This may be an audible or visual signal, or both.

While I have described the disk as an obscuring disk and depend upon a determination of departure from a predetermined position of the indicator by light obscuration, it will be understood that the circuit between the light sensitive cell and the light projector may be one which is ineffective to show a signal except when light projection occurs, in which event the obscuring disk may be reflective means, to pick up a projection beam only when the disk departs from a predetermined position.

I am aware of the fact that the relative spacing of the beams of light emerging from the slits 55 and 56 may provide a range of sensitivity which may be too broad for some of the instruments and too narrow for others, and accordingly, I may employ an obscuring disk 50 which is broad for individual instruments requiring high sensitivity, and employ narrow obscuring disks for instruments of lower sensitivity. Likewise, the disks need not be symmetrically mounted upon the indicator 32 but may be offset, depending upon whether it is desired that a determination to one side of the normal be more critical than to the other side of the normal. Thus, the disks may be positioned non-symmetrically above the indicator, where more sensitivity is desired should a deflection of the indicator occur upwardly than in a downward direction and, likewise, the disk may be non-symmetrically positioned below the indicator, where more sensitivity is desired for a deflection of the needle in a downward direction.

Other means for controlling the sensitivity of the obscuring disks will occur to those in the art, such as the employment of disks having different degrees of obscuration or translucency. The range of sensitivity may therefore be controlled by the relative density of the obscuring disks.

Likewise, the obscuring disks may be differently colored, to use color sensitivity to determine the broad or narrow range for sensitivity of each of the independent instruments, where a close tolerance defined by the indicium 14 is not intended to be maintained.

Likewise, the obscuring disks may be of varying thicknesses edgewise, to effect bending of the light, a sharply angled prism being more sensitive to bend the light quickly where high sensitivity is desired, and a flatter prism, where lower sensitivity is desired.

It will be observed that while the projecting signals emerge from the slots 55 and 56 in the form of light, other projection means, such as sonic vibrations, heat and magnetic fields may be employed, to indicate a departure of the indicator from the predetermined zone.

Accordingly, it will be observed that I have provided specific means for modifying my prior invention where, instead of inspecting each setting, an audible or visual signal may be employed, to determine whether one or more of the indicators have departed from the normal or predetermined setting.

Having thus described my invention and illustrated its use, what I claim as new and desire to secure by Letters Patent, is—

1. In a panel for a plurality of instruments, each instrument having an assembly comprising a dial and indicator movably mounted with respect to each other, and including means for mounting said instruments, whereby each one of said instruments may be substantially aligned with reference to an indicator thereof and to each other by movement of the dial and indicator bodily and without movement of a dial and an indicator relatively to each other, the combination therewith of means having independent tolerance carried by each of the indicators cooperating with signalling means on the panel to provide a signal.

2. In a panel for a plurality of instruments, each instrument having an assembly comprising an indicator, and wherein means are included for mounting said instruments whereby a plurality of said instruments may be substantially aligned bodily with reference to each other without relative movement of the indicator of such instrument, the combination therewith of means for projecting a signalling beam within a predetermined zone, and means to pick up said beam, said indicators including beam interrupting means of independent tolerance to show a departure from a predetermined setting of any one of the aligned indicators of the instruments.

3. In a panel in accordance with claim 2 wherein the beam is a light beam and the target is a light sensitive cell, and a cell circuit for providing a signal upon variation of the cell from a predetermined adjustment.

LIAN-TONG WEN.

REFERENCES CITED

The following references are of record in the file of this patent:

UNITED STATES PATENTS

| Number | Name | Date |
|---|---|---|
| 2,291,610 | Crane | Aug. 4, 1942 |
| 2,294,099 | Trapp | Aug. 25, 1942 |
| 2,365,601 | Sipman | Dec. 19, 1944 |
| 2,383,321 | Kleber | Aug. 21, 1945 |